(12) United States Patent
Gallant et al.

(10) Patent No.: US 9,918,525 B2
(45) Date of Patent: Mar. 20, 2018

(54) TOUCH FASTENER STRUCTURES

(71) Applicant: Velcro BVBA, Deinze (BE)

(72) Inventors: Christopher M. Gallant, Nottingham, NH (US); Andrew Collins, Bedford, NH (US)

(73) Assignee: Velcro BVBA (BE)

( * ) Notice: Subject to any disclaimer, the term of this patent is extended or adjusted under 35 U.S.C. 154(b) by 216 days.

(21) Appl. No.: 14/185,426

(22) Filed: Feb. 20, 2014

(65) Prior Publication Data

US 2014/0237779 A1    Aug. 28, 2014

Related U.S. Application Data

(60) Provisional application No. 61/768,076, filed on Feb. 22, 2013.

(51) Int. Cl.
| | |
|---|---|
| A44B 18/00 | (2006.01) |
| B29C 33/44 | (2006.01) |
| B29C 43/22 | (2006.01) |
| B29C 43/46 | (2006.01) |
| B29C 43/50 | (2006.01) |
| B29C 33/42 | (2006.01) |
| B29L 31/00 | (2006.01) |

(Continued)

(52) U.S. Cl.
CPC ...... *A44B 18/0049* (2013.01); *A44B 18/0065* (2013.01); *B29C 33/42* (2013.01); *B29C 33/44* (2013.01); *B29C 43/222* (2013.01); *B29C 43/46* (2013.01); *B29C 43/50* (2013.01); *B29C 59/025* (2013.01); *B29C 59/04* (2013.01); *B29C 2043/461* (2013.01); *B29L 2031/729* (2013.01); *Y10T 24/2767* (2015.01)

(58) Field of Classification Search
None
See application file for complete search history.

(56) References Cited

U.S. PATENT DOCUMENTS 4,775,310 A * 10/1988 Fischer .............. A44B 18/0049
425/308
4,894,060 A * 1/1990 Nestegard .......... A44B 18/0053
128/DIG. 15

(Continued)

FOREIGN PATENT DOCUMENTS

| CN | 1143637 | 3/2004 |
|---|---|---|
| CN | 1893848 | 1/2007 |

(Continued)

OTHER PUBLICATIONS

International Search Report and Written Opinion for PCT/EP2014/053297 dated Jul. 23, 2014 (10 pp).

(Continued)

*Primary Examiner* — Matthew Daniels
*Assistant Examiner* — Kimberly A Stewart
(74) *Attorney, Agent, or Firm* — Fish & Richardson P.C.

(57) ABSTRACT

Touch fastener products, as well as apparatus and methods for manufacturing such products, are described. The methods and apparatus feature certain mold cavity shapes that are designed to facilitate demolding of hammer hook touch fastener elements exhibiting desirable fastening properties. Such mold cavity shapes can be combined with particularly soft molding resins to produce useful fastening products.

27 Claims, 13 Drawing Sheets

(51) Int. Cl.
*B29C 59/04* (2006.01)
*B29C 59/02* (2006.01)

(56) References Cited

U.S. PATENT DOCUMENTS

| | | | |
|---|---|---|---|
| 4,984,399 A | | 1/1991 | Taylor |
| 5,067,210 A | * | 11/1991 | Keyaki ............... A44B 18/0053 24/442 |
| 5,260,015 A | | 11/1993 | Kennedy et al. |
| 5,669,120 A | | 9/1997 | Wessels et al. |
| 5,679,302 A | | 10/1997 | Miller et al. |
| 5,845,375 A | | 12/1998 | Miller et al. |
| 5,868,987 A | * | 2/1999 | Kampfer ............ A44B 18/0061 24/442 |
| 6,162,040 A | * | 12/2000 | Clune ................. A44B 18/0049 264/167 |
| 6,190,594 B1 | * | 2/2001 | Gorman ................ B29C 59/002 264/167 |
| 6,248,276 B1 | | 6/2001 | Parellada et al. |
| 6,287,665 B1 | | 9/2001 | Hammer |
| 7,032,278 B2 | | 4/2006 | Kurtz |
| 7,056,462 B2 | | 6/2006 | Provost et al. |
| 7,727,440 B2 | | 6/2010 | Armela et al. |
| 8,061,886 B1 | * | 11/2011 | Kraus, Jr. ............... H01R 25/14 362/147 |
| 9,210,970 B2 | | 12/2015 | Collins et al. |
| 2002/0124359 A1 | * | 9/2002 | Murasaki ............ A44B 18/0049 24/452 |
| 2003/0106188 A1 | * | 6/2003 | Armela ............... A44B 18/0049 24/451 |
| 2003/0145440 A1 | | 8/2003 | Ausen et al. |
| 2004/0020591 A1 | * | 2/2004 | Tuma .................. A44B 18/0049 156/242 |
| 2004/0043186 A1 | * | 3/2004 | Tachauer ........... A44B 18/0049 428/100 |
| 2005/0081346 A1 | | 4/2005 | Clarner |
| 2006/0019059 A1 | | 1/2006 | Seth et al. |
| 2010/0180407 A1 | * | 7/2010 | Rocha ..................... B29C 59/04 24/452 |
| 2012/0174348 A1 | | 7/2012 | Cheng |

FOREIGN PATENT DOCUMENTS

| | | |
|---|---|---|
| EP | 1700532 B1 | 1/2011 |
| PL | 2157878 | 1/2012 |
| WO | WO2000/00053 | 1/2000 |
| WO | WO 2000/18268 | 4/2000 |
| WO | WO2000/25620 | 5/2000 |

OTHER PUBLICATIONS

Written Opinion of the International Preliminary Examining Authority for PCT/EP2014/053297 dated Mar. 16, 2015 (6 pp).
Office Action in Chinese Application No. 201480013395.7, dated Aug. 5, 2016, 20 pages (with English translation).
European Examination Report in European Application No. 14706809.2, dated Aug. 17, 2017, 6 pages.
Chinese Office Action in Chinese Application No. 201480013395.7, dated Sep. 30, 2017, 7 pages (English Translation).
Office Action in Chinese Application No. 201480013395.7, dated Mar. 15, 2017, 13 pages (with English translation).

* cited by examiner

TOUCH FASTENER STRUCTURES

TECHNICAL FIELD

This specification generally relates to touch fasteners, such as those featuring arrays of discrete, miniature structures for releasably engaging with a mating material, such as a loop or cooperative structural array.

BACKGROUND

A number of touch fastening systems, such as those found in personal care and other products, feature arrays of discrete hooking structures that extend from a common base. Many such products are formed from resin, such as by molding the base and hooking structures from a unitary resin flow, or severing the rails of a plastic extrusion, or by molding the base with preform structures (e.g., straight stems) that are later deformed to create hooking structures. Some hooking structures are hook-shaped, with tips that extend in a primary lateral direction to define a crook. Some hooking structures have multiple crooks, with an example being a 'palm tree' structure with tips extending in two opposite directions. Some hooking structures are known as 'mushroom-type' and feature engaging heads that overhang the base all around a supporting stem.

Molding hooking structures with overhanging heads, and then removing such structures from their cavities without opening the cavities requires selecting a resin and a hook shape that will allow the molded elements to temporarily deform while being pulled from the mold, and that will also provide a desired level of peel resistance during use. How to design hook shapes to enable demolding from closed cavities is taught, for example, in U.S. Pat. No. 4,984,399 to Provost.

Improvements are continuously sought to facilitate the manufacture of fastener products with desired properties, including peel and shear strength and touch softness.

SUMMARY

One or more aspects of the invention draws from a realization that certain mold cavity and preform structure shapes can facilitate demolding (i.e., removal from non-opening cavities) of useful touch fastener elements or element preforms having desirable fastening properties, and that such shapes may be usefully combined with particularly soft molding resins to produce useful fastening products.

In one aspect, the invention features a method of making a touch fastener that includes: filling an array of discrete cavities with moldable resin, the cavities each opening onto an outer surface of a mold and otherwise closed, each cavity having a stem portion extending from the outer mold surface to a head portion undercut on two opposite sides of the stem portion; forming a layer of moldable resin on the outer mold surface, such that the layer of resin interconnects the discrete cavities; at least partially solidifying the resin in the filled cavities to form resin projections extending from the resin layer; and with the cavities remaining closed, withdrawing the projections from their cavities, such that the projections, as withdrawn from their cavities, each include a stem and a distal head extending to tips overhanging the resin layer on two opposite ends of the head. The head portion of the cavity is distally bounded by a surface with two opposing inner edges that, as the farthest edges from the outer mold surface, are curved inwardly at least along a central region of the head portion.

In this context, by "curved inwardly" we mean that the edge or surface bows inward toward the center of the mold roller without inflection point over the range in question, to extend farthest from the outer mold surface at a point between ends of the range in question. Conversely "curved outwardly" means that an edge or surface bows outward away from the center of the mold roller without inflection point over the range in question, to extend closest to the outer mold surface at a point between ends of the range in question. To "curve inwardly" or "curve outwardly" does not necessarily mean that the curvature of the edge or surface is constant over the range in question.

In some examples, the inner edges are radiused.

In some cases, the cavities are filled with resin having a modulus of between 100 and 300 ksi.

In some implementations, the inner edges are curved inwardly along an entire width of the head portion.

In some applications, the inner edges are curved inwardly over a greatest dimension of the head portion.

In some examples, the inner edges define a radius of curvature, a center of the radius of curvature being disposed on an opposite side of the outer surface of the mold.

In some cases, the surface bounded by the inner edges is curved inwardly over an entire width between the inner edges.

In some embodiments, the stem portion has a lateral thickness that is at least 50 percent of a farthest distance of the head portion from the mold surface.

In some implementations, the head portion of each cavity is undercut on only the two opposite sides of the stem portion, such that the heads, as withdrawn from the cavities, overhang the resin layer on only two sides of each stem. In some cases, the cavities are shaped such that the stems of the projections, as withdrawn from the cavities, each have two, oppositely directed flat sides. In some examples, the head portion of each cavity is shaped such that the heads of the projections have two, oppositely directed flat sides coplanar with the flat sides of the stems. In some cases, the method further includes after withdrawing the projections from the cavities, modifying the heads to cause the heads to overhang the resin layer on more than two sides of each stem.

In some embodiments, the heads of the projections, as withdrawn from the cavities, have outer surfaces directed away from the resin layer that are bounded by edges that are curved outwardly over at least central regions of the heads. In some examples, the outer surfaces of the heads of the projections are curved outwardly over at least central regions of the heads. In some applications, the outer surfaces of the heads are concave in the central regions of the heads, such that the outer surfaces of the heads define recesses.

In some examples, the outer mold surface is a circumferential surface of a mold roll into which mold roll the cavities extend, and filling the array of cavities includes pressing the resin into the mold roll as the mold roll is rotated. In some examples, the formed resin layer is longitudinally continuous. In some cases, the method further includes laminating the resin layer to a substrate. In some applications, laminating the resin layer includes introducing the substrate to molten resin of the resin layer and pressing the molten resin into surface recesses of the substrate. In some embodiments, the method further includes forming a series of resin layers along a length of the substrate, each layer carrying multiple projections.

In some implementations, the cavities are filled with resin having a modulus of between 1.5 and 300 ksi. In some examples, the cavities are filled with a resin having a modulus between 1.5 and 40 ksi. In some applications, the cavities are filled with a resin having a modulus between 1.5 and 15 ksi.

In some applications, the method further includes after withdrawing the projections, increasing a stiffness of only the heads of the projections. In some examples, increasing the stiffness of only the heads includes applying a rigid cap material to the head. In some cases, increasing the stiffness of only the heads includes implementing a polymer cross-linking process.

In some cases, the method further includes after withdrawing the projections, plastically deforming the heads of the projections. In some examples, prior to deforming, one end of each projection head is elevated farther from the resin layer than an opposite end of the projection head, and wherein deforming the heads includes lowering the elevated ends.

In another aspect, the invention features a male touch fastener element, including a stem of molded resin extending from a surrounding resin surface to an end distal from the surrounding surface, the stem having a first pair of side surfaces defining therebetween a thickness that decreases from the surrounding surface to the distal end, and a second pair of side surfaces extending between and connecting the first pair of side surfaces; and a head of resin disposed at the distal end of the stem, the head overhanging the surrounding surface and the first pair of side surfaces of the stem on two opposite sides of the stem. The head has an outer surface, directed away from the surrounding surface from which the stem extends. The stem and head have two common, oppositely directed, planar, sides such that the head overhangs on only the two opposite sides. The planar sides are molded, and the outer surface of the head, in side view, is free of any trough.

In some examples, the outer surface is bounded by edges that are curved outwardly over at least central regions of the heads, the outer surfaces of the heads being concave in the central regions of the heads, such that the outer surfaces of the heads define recesses.

In some applications, the first pair of side surfaces includes lateral side surfaces, and the thickness is a longitudinal thickness.

In yet another aspect, the invention features a method of making a touch fastener, the method including filling two discrete cavities with moldable resin, the cavities each opening onto an outer surface of a mold and otherwise closed; forming a continuous layer of moldable resin on the outer mold surface, such that the layer of resin interconnects the discrete cavities; at least partially solidifying the resin in the filled cavities to form two discrete resin projections extending from the resin layer; withdrawing the projections from their cavities, such that the projections, as withdrawn from their cavities, each include a stem and a distal head including outwardly extending arms overhanging the resin layer in a longitudinal direction and terminating in respective tips; and melding the heads of the projections by causing molded resin to flow in a lateral direction to form a single monolithic head, while leaving the stems of the projections otherwise separated.

In some implementations, the monolithic head includes a first set of loop-engageable features extending in the longitudinal direction of the base, and a second set of loop engageable features extending in a lateral direction of the resin layer.

In some applications, the first set of loop-engageable features includes the arms of the respective heads of the projections. In some examples, the arms of the respective heads of the projections are melded together inward of their respective tips, so as to create a notch between the tips that extends inward toward a central region of the head.

In some cases, melding the heads of the projections includes heating the heads above the melting point of the resin and exerting pressure on the heads. In some applications, the second set of loop-engageable features includes curved wing structures formed by the heat and pressure on the heads of the projections.

In some examples, the projections, as withdrawn from the cavities are separated by a lateral distance of at most about 0.004 inch.

In some implementations, each of the cavities includes a stem portion extending from the outer mold surface to a head portion undercut on two opposite sides of the stem portion. In some examples, the head portion of each cavity is distally bounded by a surface with two opposing inner edges that, as the farthest edges from the outer mold surface, are curved inwardly at least along a central region of the head cavity. In some cases, the cavities remain closed as the projections are withdrawn from the cavities.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
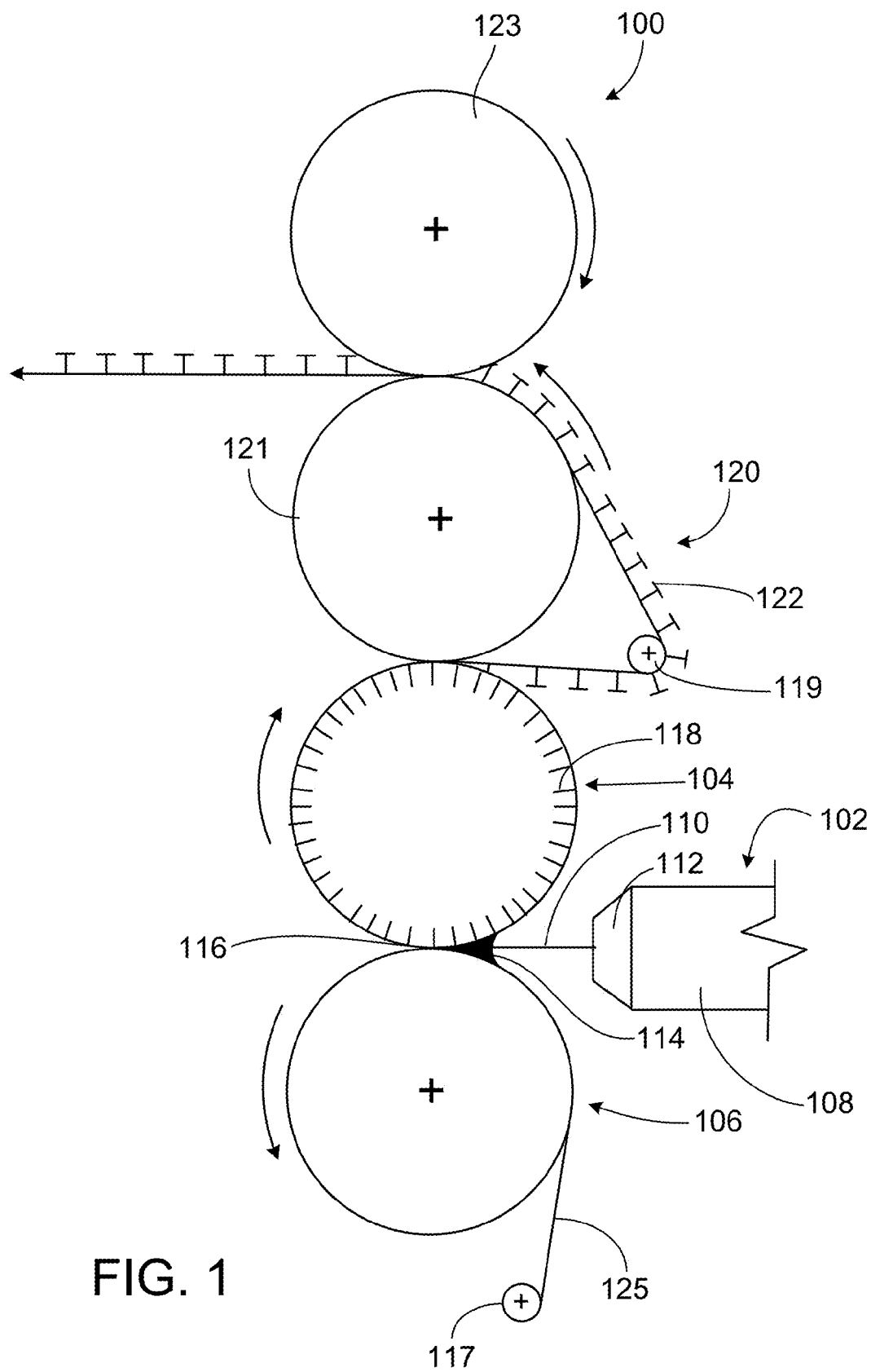
FIG. 1 is a schematic representation of a method and apparatus for making a touch fastener product in accordance with one or more embodiments of the present disclosure.

FIG. 1 illustrates a continuous molding process for forming a touch fastener product. As shown, an apparatus 100 configured to perform the continuous molding process includes an extruder 102, a cavity mold roller 104, and a base roller 106. Extruder 102 includes an extruder barrel 108 that melts and forces a molten resin 110 (e.g., molten thermoplastic resin) through a die 112. The resin 110 provided by extruder 102 pools in a supply bank 114 which is pulled into a pressure nip 116 between cavity mold roller 104 and base roller 106.

Under pressure in nip 116, resin 110 is forced into mold cavities 118 defined about the perimeter of cavity mold roller 104. A continuous layer of resin interconnecting the mold cavities remains on the surface of cavity mold roller 104 to form a strip-form base that supports the resulting molded fastener elements. In this example, cavities 118 are shaped to form fastener elements, such as described below in detail. For a time, resin 110 travels together with the rotating cavity mold roller 104 as the resin begins to solidify. In some examples, the cavity mold roller is chilled to promote resin solidification. The partially solidified touch fastener product 120 (which includes the molded fastener elements and the continuous base) is removed from the cavity mold roller by pulling the solidified fastener elements 122 from their respective mold cavities 118 using a stripper roller 119. Note that the size, spacing and shape of the fastener elements 122 and the corresponding cavities 118 are illustrated only schematically in this figure.

Touch fastener product 120 is then optionally passed through a second nip between a wrap-around roller 121 and a calender roller 123 while the resinous touch fastener elements 122 are still relatively soft and readily deformable. Calender roller 123 knocks down any upstanding heads of the fastener elements by contact pressure. In some examples, calender roller 123 is heated so as to partially melt solidified preform structures, which can be molded with overhanging heads prior to being deformed to form the finished fastener product (see, e.g., FIGS. 19-25). Alternatively, such preform structures may be reheated just before introduction to the calender roller, such as by a flame treatment. Such a treatment is described, for example, in U.S. Pat. No. 6,248,276, the entire contents of which are hereby incorporated by reference.

The method can also include an optional laminating operation in which moldable resin to form the fastener elements and any interconnecting base layer is applied directly onto a substrate, such as a woven or non-woven backing sheet. For example, the apparatus can also include a sheet roller 117 which provides a backing sheet 125 to nip 116 such that the backing sheet forms an even laminate backing for the resulting fastener product. The backing sheet can be any suitable woven or non-woven flexible substrate for forming a laminated touch fastener product (e.g., a point un-bonded web, a conventional woven loop, a knit loop, such as Loop 3900 from Velcro USA, or a non-woven loop, such as Aspen from Velcro USA).

The optional lamination process is particularly useful when dealing with soft, stretchable resins that would otherwise be difficult to convey through calender stacks and other web handling equipment. Laminating the resin onto a backing sheet can significantly increase in-plane stiffness, resulting in a product that is more easily handled and processed.

In nip 116, resin 110 is forced, under nip pressure, into any pores or apertures in backing sheet 125. In this way, the base layer of resin 110 intimately bonds to backing sheet 125, in some cases encapsulating fibers or other surface features of the backing sheet. As described in U.S. Pat. No. 5,260,015, the entirety of which is incorporated herein by reference, penetration of resin 110 into pores of backing sheet 125 can be a function of a number of variables. For example, penetration may depend on the thickness or porosity of backing sheet 125, the viscosity of molten resin 110, the resin temperatures and/or the pressure maintained (e.g., via hydraulics) in nip 116.

Although FIG. 1 provides an exemplary apparatus for forming a touch fastener product, various other apparatus are also envisioned. For example, a forming nip for receiving the molten resin and the optional backing sheet under pressure can be formed between the curved surface of a cavity mold roller and a complementary injection die. Such methods and apparatus are described in U.S. Pat. No. 5,669,120, the entire contents of which are hereby incorporated by reference.

As another alternate arrangement, the apparatus can be configured to forming a series of discrete islands of fastening elements on the backing sheet. For example, discrete quantities of resin can be applied to the backing sheet upstream of nip 116, so as to form longitudinally discontinuous resin islands along a length of the backing sheet, with each island carrying multiple fastening elements. As another example, the cavity mold roller can include mold cavities over only discrete portions of its periphery, or some of the mold cavities can be covered up to form the islands of fastening elements, as shown in U.S. Pat. Nos. 7,032,278 and 7,056,462.

Figure 2A:
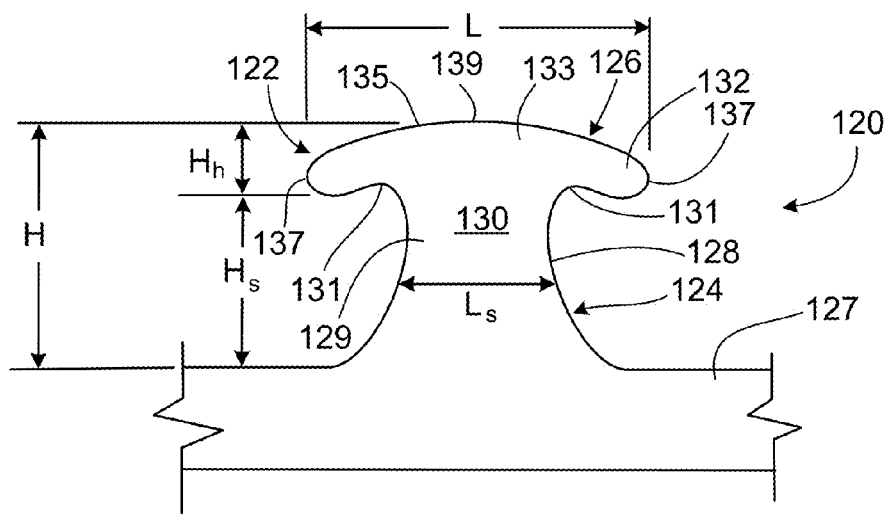
FIG. 2A is a side view of diagram portraying a small section of a touch fastener product such as can be made using the method and apparatus of FIG. 1.
Figure 3:
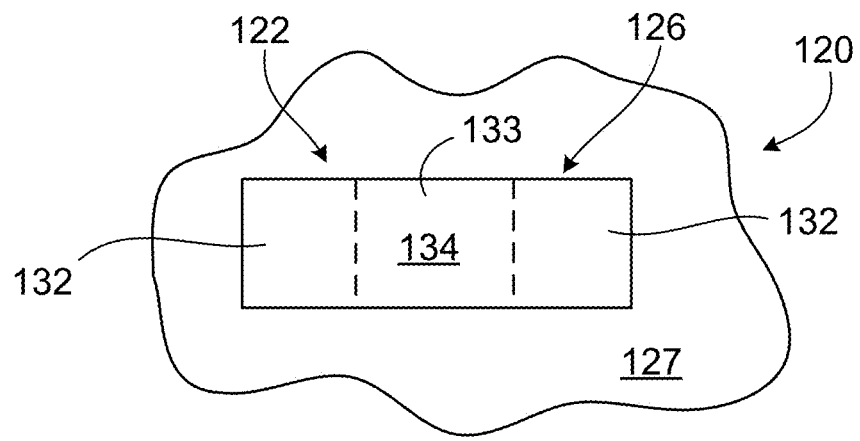
FIG. 3 is a top view of the touch fastener product of FIG. 2A.
Figure 4:
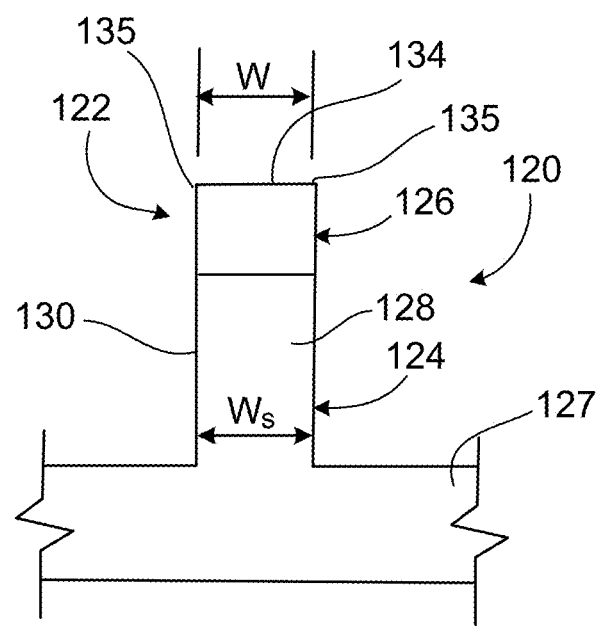
FIG. 4 is a front view of the touch fastener product of FIGS. 2A and 3.

Referring next to FIGS. 2A, 3, and 4, an example touch fastener product 120 includes an array of hammer hook fastener elements 122 carried on a sheet-form base of molded resin 127 (for illustrative purposes just one fastener element is shown and considered representative of the array; examples of arrays are shown in other figures). Fastener elements 122 feature a broad stem 124 of molded resin formed integrally with and rising from the supporting sheet-form base 127, and a head 126 contiguous with a distal neck 129 of the stem. Fastener element 122 defines a total height "H" measured in direction perpendicular from the base, a total width "W" measured in a lateral direction of the base (i.e., the cross-machine direction), and a total length "L" measured in a longitudinal direction of the base (i.e., the machine direction). Note that the "total" dimensions are measured between edges or surfaces of the fastener element that are farthest apart from one another in a given direction.

In some examples, the total width is within a range of about 100 and 400 microns. In some examples, the total length is within a range of about 200 and 500 microns. In some examples, the total height is within a range of about 150 and 350 microns. However, fastener elements outside of these dimensions are also envisioned.

As shown, stem 124 has two lateral side surfaces 128 which define a longitudinal thickness "$L_s$" between them. As shown, the longitudinal thickness "$L_s$" gradually decreases from the supporting base to the distal neck of the stem, providing a continuous taper. In some examples, the longitudinal thickness of the stem at the base is between about 200 and 500 microns. In some examples, the longitudinal thickness of the stem at the neck is between about 100 and 250 microns.

Two planar side surfaces 130 extend between and connect lateral side surfaces 128. The planar side surfaces define a constant width of the stem "$W_s$." In some examples, the stem width is between about 100 and 400 microns. Side surfaces 130 may be formed using a mold cavity formed between adjacent mold plates in a mold roller as taught by Fisher in U.S. Pat. No. 4,775,310 (see also mold cavity 118 as discussed below with reference to FIG. 6).

The planar side surfaces of the stem are molded surfaces. By "molded surfaces" we mean that the surfaces are formed by solidifying molten resin against a mold surface—as opposed to, for example, forming the surfaces by severing an extruded rail of resin. Molded surfaces are generally characterized as having different polymer chain orientation at the surface than severed surfaces, due to the flow of resin along the surface prior to solidification. Such surfaces can also exhibit a 'skin' effect.

The height of the stem "$H_s$" is measured from the supporting base to the neck. In some examples, the stem height is between about 100 and 300 microns.

Head 126 has what can be considered a "hammer head" shape, featuring a central region 133 extending integrally from neck 129 of stem 124, and two extending arms 132 that protrude outwardly from the central region to overhang base 127 in opposite longitudinal directions of the base. That is, the arms project outwardly in opposite directions along the machine direction, the direction the product runs during manufacture. As shown, arms 132 define respective crooks 131 for engaging features of a mating fastener product (e.g., loop fibers). In this example, head 126 shares molded side surfaces 130 with stem 124 (stated another way, the side surfaces of the head are coplanar with the side surfaces of the stem). Thus, the width of the head is equal to that of the stem and the total width of the fastener element. The height of head 126 "$H_h$" is measured as the vertical distance between the lowest point on the arm 132 to the peak of outer surface 134 at the central region 133. In some examples, the head height is between about 40 and 100 microns. A relatively low head height allows the fastener element to engage with low pile loop materials.

The edges of the head's outer surface 134 largely define its characteristic shape. While it is understood that the touch fastener element 122 is molded as a monolithic structure with a continuous surface, in the context of the present disclosure, outer surface 134 is considered to be delimited by two end points 137 near the tips of arms 132. In this example, outer surface 134 is slightly curved or bowed along the longitudinal direction of the base to define a bulbous profile in side view. In particular, outer surface 134 is directed away from base 127 to form a peak 139 near the head's central region 133. In the lateral direction, outer surface 134 is bounded by edges 135 that are curved outwardly over substantially the entire length of the head (note that the head length is equal to the total length). With respect the fastener elements, by "curved outwardly" we mean that the edge or surface bows without inflection point over the range in question, to extend farthest from the base at a point between ends of the range in question. Conversely "curved inwardly" means that the edge or surface bows without inflection point over the range in question, to extend closest to the base at a point between ends of the range in question. To "curve inwardly" or "curve outwardly" does not necessarily mean that the curvature of the edge or surface is constant over the range in question.

In the illustrated example, outer surface 134 exhibits a relatively large radius of curvature with respect to the overall height of the fastener element. However, in some other examples, the degree of curvature can be significantly more or less severe. In particular, in one or more embodiments discussed below, outer surface 134 may not exhibit any noticeable curvature, so as to appear substantially flat. The degree of curvature in the outer surface of the head can be a function of various process parameters. For example, a softer resin is expected to produce a head with an outer surface that is a more faithful representation of the shape of the mold cavity than a harder resin, because the softer resin allows the molded structure to stretch during de-molding and then recover to the molded shape.

Figure 2B:
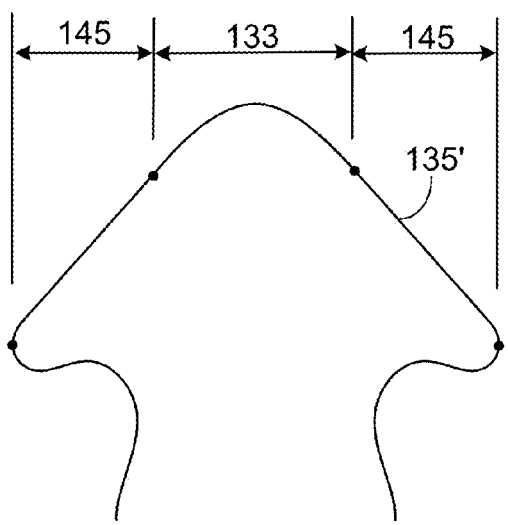
FIGS. 2B and 2C are diagrams illustrating alternate embodiments of heads with edges curved inwardly over just the central region of the heads.
Figure 2C:
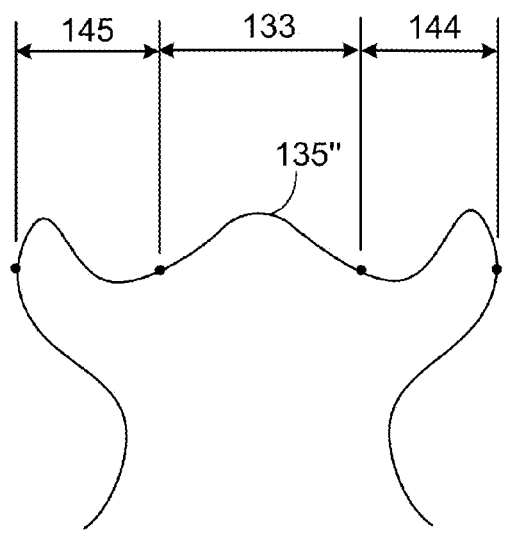

As noted above, in FIG. 2A, the outer surface 134 of the head 126 and the edges 135 which bound the outer surface are curved outwardly over substantially the entire length of the head. However, it is appreciated that other embodiments where the outer surface of the head and/or the bounding edges are curved outwardly over just a central region of the head are also contemplated. For example, FIG. 2B illustrates an edge 135' where the central region 133 is curved outwardly, but the outlying portions along the arms 145 of the head are substantially planar. As another example, FIG. 2C illustrates an edge 135" where the central region 133 is curved outwardly, but the outlying portions along the arms 145 are curved inwardly. Of course various other configurations are also contemplated. For instance, the upper surface edges can be curved outwardly over a majority of the head length, as opposed to just the central region.

Figure 5:
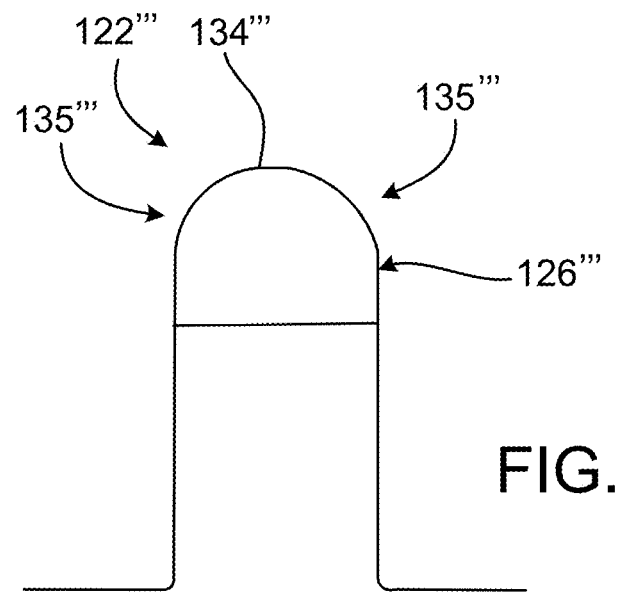
FIG. 5 is a front view of a touch fastener element exhibiting radiused edges along the outer surface of the head.

Note that FIG. 4 illustrates an example where the fastener element exhibits a head having an outer surface bounded by what are drawn as relatively sharp edges (i.e., edges 135). However, in some other examples, the edges can be curved or radiused. For example, fastener element 122''' shown in FIG. 5 features a head 126''' with an outer surface 134''' bounded by edges 135''' that exhibit significant curvature. For many applications, any radius would be less than about 0.001 inch, or less than 25 percent of the width of the head. The curved edges can be formed during the molding process by adapting the contact surfaces of the mold cavities; or alternatively, using a post-processing burnishing operation (e.g., a friction or flame burnishing operation) that "breaks" any relatively sharp molded edges.

Figure 6:
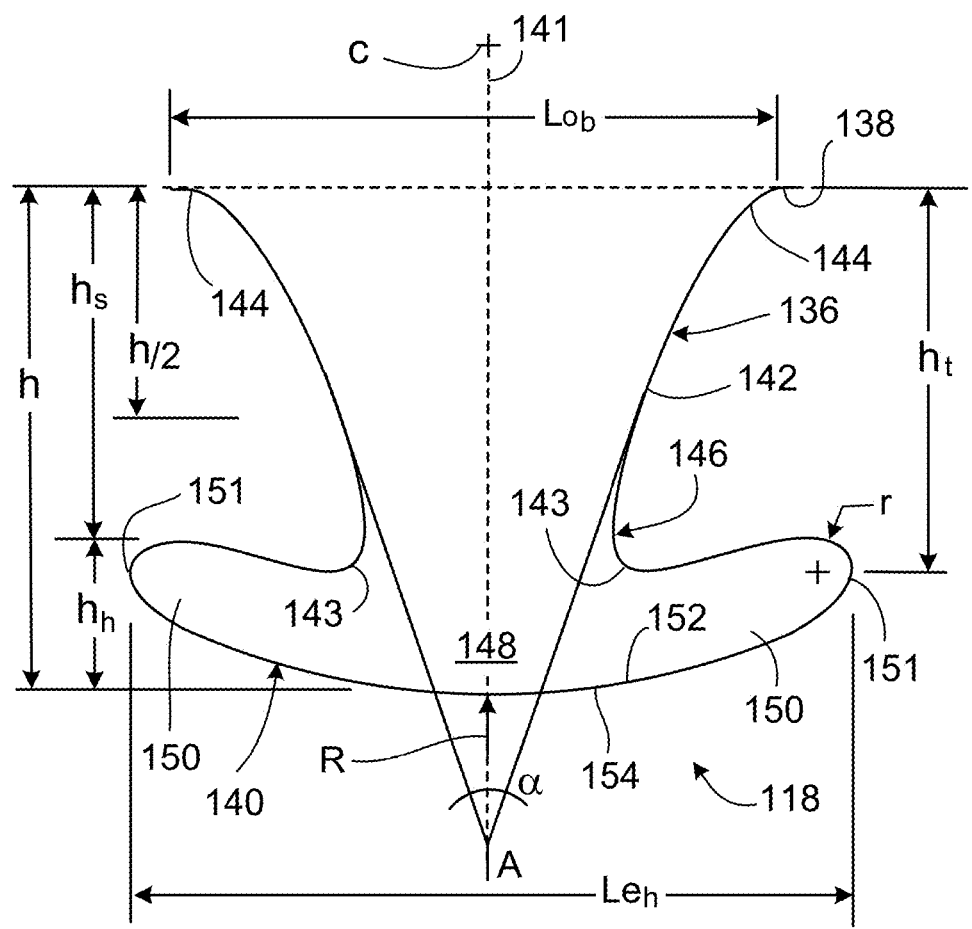
FIG. 6 is a schematic view of a mold cavity such as can be used in the method and apparatus of FIG. 1.

FIG. 6 shows an example mold cavity 118, such as can be used in cavity mold roller 104 to produce hammer hook fastener elements 122. In some examples, the mold cavity is formed in the periphery of a disk-form mold plate, which can be stacked alternately with spacer plates that form the flat side surfaces of the fastener elements. Thus, the thickness of the mold plate in the lateral direction of the base defines the width of the resulting fastener elements. In some examples, the mold plate has a thickness of ranging from about 0.004 (127 microns) to about 0.012 inch (203 microns). In some examples, the spacer plates has a thickness ranging from about 0.003 (76 microns) to about 0.012 inch (203 microns).

As shown, mold cavity 118 features a stem portion 136 extending from the outer circumferential mold surface 138 to a head portion 140. Mold cavity 118 is symmetrical about a centerline 141 and extends to a total height "h" and a half height "h/2". Stem portion 136 has the profile similar to the base of a broad triangle with relatively straight sides 142 projected to intersect at a point "A" above the top of the mold cavity to define an included angle α. As shown, the base of stem portion 136 defines a longitudinal thickness "$Lo_b$", and features concave fillets 144 that provide additional clearance space to facilitate removal of the fastening elements from mold cavity 118. Stem portion 136 is considered to end at a neck area 146 where rounded shoulders 143, which define the lower surfaces of the opposing undercut sections of head portion 140, begin to project outward from the stem. The height "$h_s$" of stem portion 136 is greater than the half height "h/2" of mold cavity 118.

Head portion 140 extends from neck 146 of stem portion 136 to define a height "$h_h$" and a length "$Le_h$". Head portion 140 has a hammer head shape featuring a central section 148 directly above stem portion 136 and two undercut sections 150 on opposite sides of the stem portion. As shown, undercut sections 150 terminate in rounded tips 151 having a radius "r" centered at a point at a height distance "$h_t$" from mold cavity surface 138. Undercut sections 150 are shaped to form the outwardly projecting arms of the resulting fastener elements.

Head portion 140 features an upper surface 152 that distally bounds mold cavity 118, forming the outer-most border of the mold cavity relative to the mold roll surface. The upper surface has two opposing inner edges 154 that, as the farthest edges from the mold surface 138, are curved inwardly toward the center of the cavity roller, away from the surface of the mold, along the entire length of head portion 140. However, as suggested above, the inner edges can be curved inwardly along just the central region of the head portion, or along a majority of the length of the head portion. The inner edges can be relatively sharp or radiused.

Further, in this example, the edges 154 of upper surface 152 define a radius of curvature "R", with the center "C" being disposed at a point beyond the outer mold surface 138. The upper surface, which is bounded by inner edges 154, may be curved inwardly over an entire width between the edges.

Mold cavities 118 are shaped and dimensioned to allow solidified fastener elements to be pulled from the open ended, but otherwise closed, cavities without unacceptable permanent deformation. Table 1 below provides the dimensions of two example mold cavities.

TABLE 1

| Dimension | Example 1 | Example 2 |
| --- | --- | --- |
| Total height h (inch, microns) | 0.0130, 330 | 0.0098, 248 |
| Angle α | 33° | 33° |
| Longitudinal thickness of stem at base $Lo_b$ (inch, microns) | 0.0160, 406 | 0.012, 305 |
| Stem portion height $h_s$ (inch, microns) | 0.0095, 241 | 0.0071, 181 |
| Head portion height $h_h$ (inch, microns) | 0.0035, 89 | 0.0026, 67 |
| Head portion length $Le_h$ (inch, microns) | 0.020, 508 | 0.015, 381 |

TABLE 1-continued

| Dimension | Example 1 | Example 2 |
| --- | --- | --- |
| Arm height $h_t$ (inch, microns) | 0.0104, 264 | 0.0078, 198 |
| Radius of curvature R (inch, microns) | 0.0250, 635 | 0.019, 476 |

Figure 7:
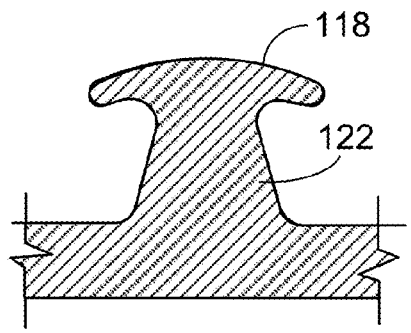
FIGS. 7-12 are schematic views illustrating the removal of a molded hammer hook fastener element from the mold cavity of FIG. 6.
Figure 8:
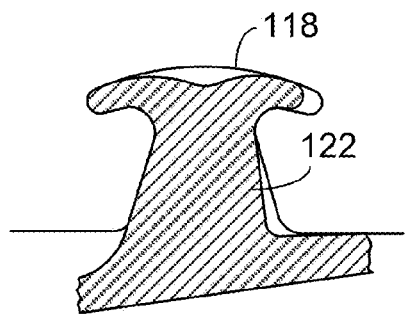
Figure 9:
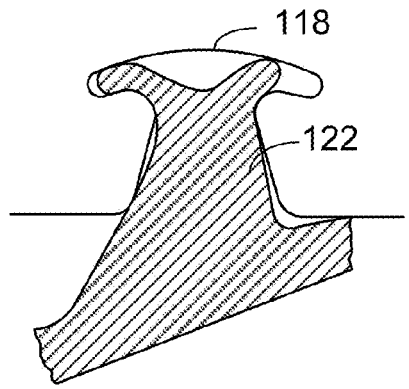
Figure 10:
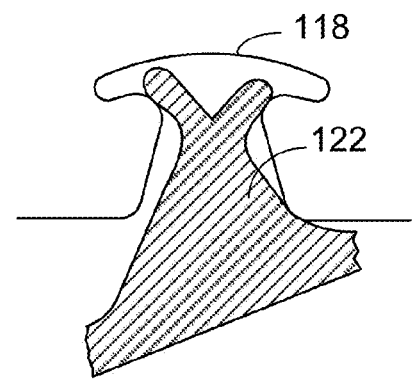

FIGS. 7-12 illustrate removal of a fastener element 122 from such a mold cavity 118. Referring first to FIG. 7, the resin which forms the fastener element completely has been pressed into mold cavity 118 by nip pressure, such that the resin completely fills the cavity and the remaining resin forms a base layer against the mold surface. The molded fastener element is removed from the cavity once the resin has at least partially solidified. In particular, the touch fastener element is removed once the resin has cooled sufficiently to retain its shape without the aid of the mold cavity and to be sufficiently resilient to return to its desired shape after being pulled from the mold cavity, while still being flexible enough to permit removal without destructive stresses in the molded structure. FIGS. 8-11 show the progressive sequence of removal of the fastener element as the touch fastener product is pulled by the stripper roll and the cavity mold roller continues to rotate. As shown, the relative movement between touch the fastener product and the cavity mold roller forces the fastener element out through the open end of the otherwise closed cavity. In particular, the shoulders of mold the cavity 118 bear on the molded arms of touch fastener element 122, causing the arms to buckle and the bulbous central region of the head to at least partially collapse inward on itself. Note that the arm facing in the direction of travel (to the left of the figure) undergoes significantly more bending than the arm facing against the direction of travel. The force required to pull the head from the mold cavity is translated to the neck of the stem, causing the neck to stretch slightly along its length. The stretching of the neck causes it to shrink in longitudinal thickness, distancing it from the side walls of the mold cavity and reducing friction, which helps to facilitate removal of the molded hook. The stretching of the neck can be completely elastic, or in some cases some plastic deformation can be effected, thereby increasing the height of the fastening element.

The stem should be strong enough to withstand the head pullout force with limited stretching, while allowing enough stretching to relieve friction and facilitate demolding (as described above). In some applications, the mold cavity is provided with a lateral thickness that is at least half the cavity's overall height "h". It is believed that lowering the surface area to volume ratio of the hook head may decrease the tendency of the neck to stretch. Alternatively, demolding the molded stem before the stem core has completely solidified may cause the stem surfaces to stretch and accentuate a depression at the upper surface of the head. Using the lateral thickness as a control dimension creates a structure that helps with demolding while leaving the characteristic profile shape of the hook unchanged, so that it retains its fastening properties. As such, this approach may be particularly advantageous when used with stiffer resins.

Figure 11:
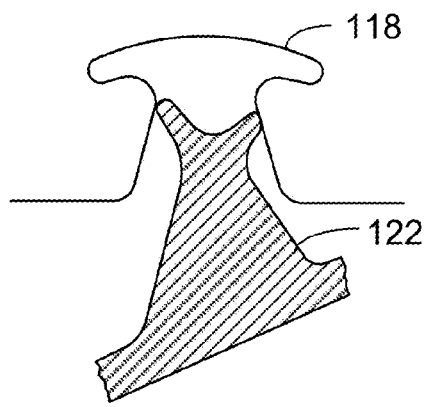
Figure 12:
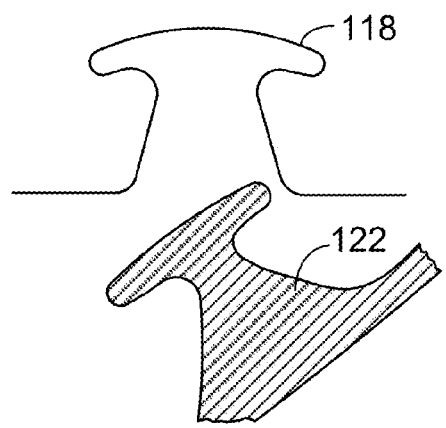

As shown in FIG. 11, the deformed head is pulled through the cavity's stem portion. Thus, the relatively wide dimensions of the stem portion of the cavity (in the longitudinal direction) facilitate removal of the fastener element without severe deformation of the head.

As discussed above, removing the fastener elements from the mold cavity causes the heads of the elements to undergo a significant amount of deformation. The deformation must be at least partially recovered to achieve the desired hook shape. Thus, in general relatively soft, flexible resins are more suitable for this purpose, as they are more prone to spring back towards their molded shape in order to recover deformation. Suitable resins may have an elastic modulus in the range of about 1.5 to 300 ksi (about 10 to 2,068 MPa). In various implementations, resins including polypropylene, thermoplastic rubber, polyethylene, as well as various blends and combinations of such resins were used to successfully produce fastener elements.

Figure 13:
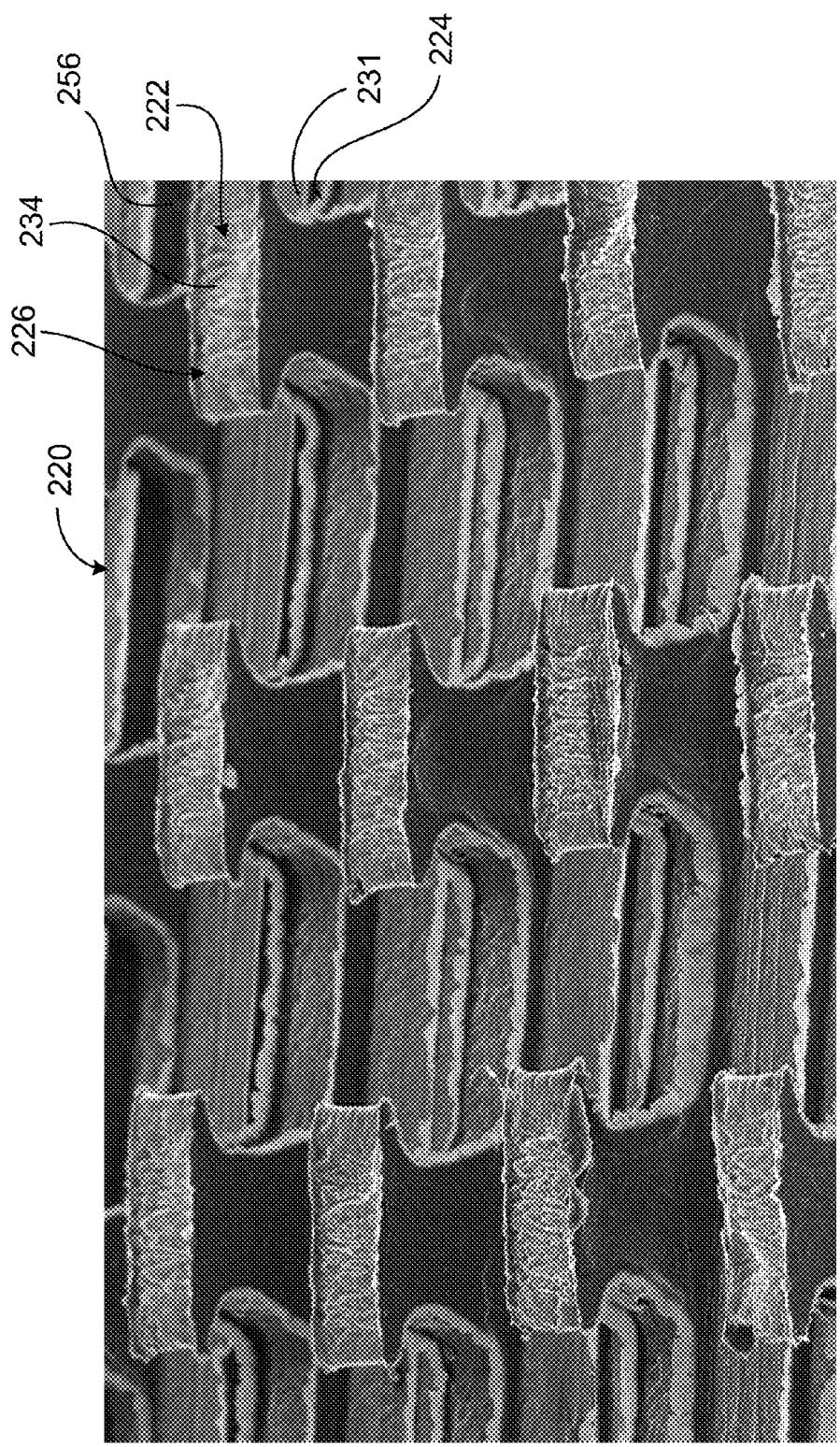
FIG. 13 is a photograph of an example touch fastener product exhibiting flash along the molded edges of the hammer hook fastener elements.

FIG. 13 shows an example of a touch fastener product 220 produced according to the continuous molding techniques and apparatus described above with reference to FIG. 1. In this case, touch fastener product 220 was produced without the optional laminating process. In this implementation, the resin was a low modulus polypropylene composition having a modulus around 150 ksi (about 1,034 MPa); the line speed was about 40 ft./min. (about 12.192 meters/min.; the nip pressure was generated by applying about 600-800 pounds of calender contact force per inch 67.67-90.22 kN per mm) of resin he hook cavities were dimensioned according to Example 2 as set forth in Table 1; and the temperature at the calender roller was about 70° F. (about 21.1° C.).

The resulting fastener elements 222 have the characteristic hammer head shape with heads 226 that exhibit substantially flat outer surfaces 234. The fastener elements have a total height of about 224 microns, a total width of about 142 microns; a longitudinal thickness at the neck of the stem that is about 166 microns; a head height of about 67 microns; and a head length of about 300 microns. The arms of the head project outward in either longitudinal direction to overhang the base at an arm length of about 67 microns.

In this particular example, the vast majority of the edges along stems 224 and heads 226 of the fastener elements 222 present a significant amount of rough excess material or "flash" 256. The flash is created when molten resin leaks between the stacked plates of the mold cavity roller during the continuous molding process. The leaking phenomenon can occur, for example, when the mold plates are not fit together tightly enough or when the plates are not properly aligned. If not removed or modified before use, the flash may feel rough to the touch of a user. Conventional burnishing techniques can be used to remove the flash.

Figure 14:
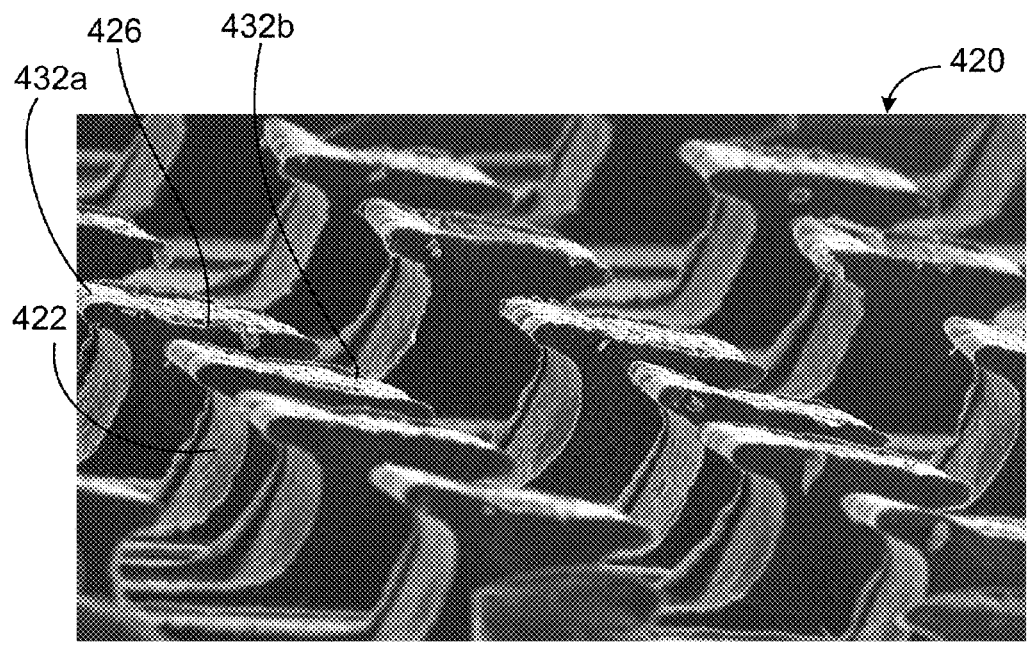
FIG. 14 is a photograph of a touch fastener product with hammer hook fastener elements that exhibit tilted heads.

FIG. 14 shows another example of a touch fastener product 420 produced according to the continuous molding techniques and apparatus described above with reference to FIG. 1. In this implementation, the fastener product was produced under the same process parameters as the example shown in FIG. 13. However, in this case, the product was not subjected to the knock down process, leaving the leading tips more elevated than the trailing tips.

As shown, fastener elements 422, particularly the heads 426, did not completely recover from to their molded shape from the deformation occurring during removal from the corresponding mold cavities. This occurrence can be a result of various process parameters; for example, the amount of solidification by the resin before removal and/or the elastic modulus of the resin. As discussed above, the arm 432a projecting outward in the direction of travel of the base undergoes greater deformation than the opposing arm 432b during de-molding. Thus, arm 432a remains significantly upturned or "sprung" compared to arm 432b, which gives the head 426 a tilted profile. The tilted fastener heads 426 can provide directional properties which may be desired in some applications. In particular, fastener product 420 would be expected to provide better fastening strength (in context of the present disclosure, fastening strength can include peel strength and/or shear strength) and softness in the longitudinal or machine direction of arm 432a than in the opposing direction of arm 432b. Note that the fastener product 420 can be subjected to the knock process or flattening described above to modify the titled fastener heads so as to provide a more symmetrical construction.

Figure 15:
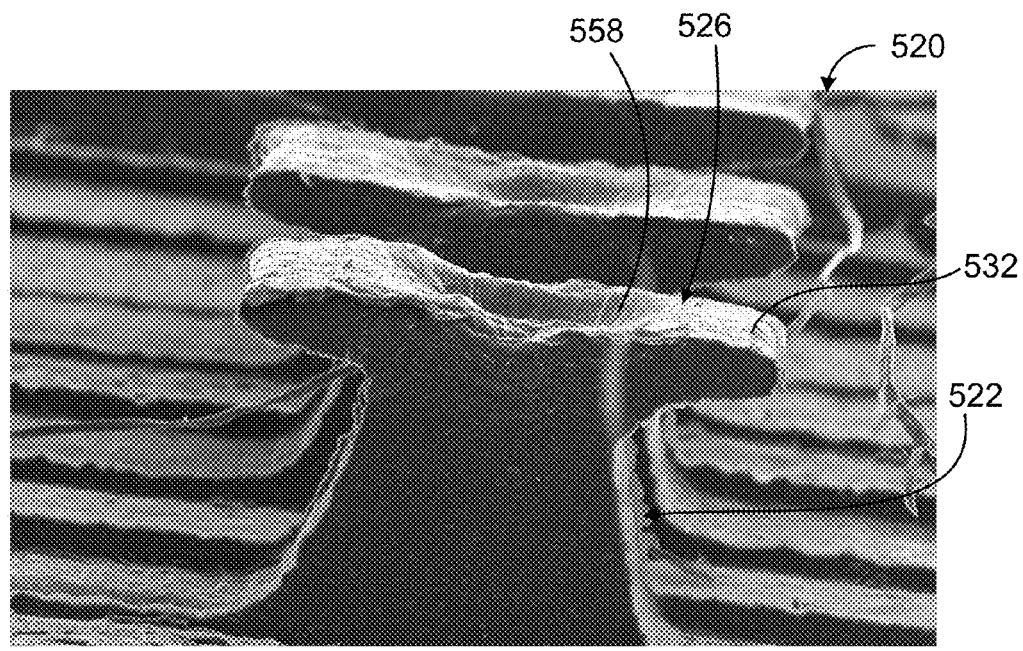
FIG. 15 is a photograph of a touch fastener product with hammer hook fastener elements that exhibit divots in a central region of the head.

FIG. 15 shows yet another example of a touch fastener product 520 produced according to the continuous molding techniques and apparatus described above with reference to FIG. 1. Note that touch fastener product 520 was produced without the optional laminating process. In this implementation, the resin was a high modulus polypropylene resin (having a modulus of about 300 ksi or about 2,068 MPa) filled with about 20 wt % Calcium Carbonate; the line speed was about 160 ft./min. (about 48.8 meters/min.); the nip pressure was developed by applying about 2,000 pounds of calender contact force per inch of resin (about 225.55 kN per mm); the hook cavities were dimensioned according to Example 1 as set forth in Table 1; and the temperature at the calender roller was about 90° F. (about 32.2° C.).

The resulting fastener elements 522 have a total height of about 244 microns; a total width of about 192 microns; a longitudinal thickness at the neck of the stem that is about 203 microns; a head height of about 85 microns, and a head length of about 422 microns. The arms of the head project outward in either longitudinal direction to overhang the base at an arm length of about 110 microns.

Fastener elements 522 have the characteristic hammer head shape in profile from a side view. However, in this implementation, fastener elements 522 include heads 526 that feature a concave divot 558 in the central region of the head between the outwardly projected arms 532. As shown, the divot or depression is completely contained within side surfaces of the head and does not extend to either flat side of the head. The divot can extend in some cases to a depth of about to about 30 microns. The divot could be a sink mark manifestation of localized shrinkage. Shrinkage occurs when the molded resinous structure solidifies unevenly. Ultimately, the localized shrinkage may be a result of one or more of various process parameters; for example, low nip pressure, insufficient cooling of the resin on the mold roller, excessive melt temperature of the molten resin, and/or the lateral width of the hammer hook fastener elements, which can range between about 100 to 400 microns.

The divot may also be the result of uneven plastic deformation during demolding, which ultimately is a result of uneven solidification. In particular, the divot may form when the hook is stretched during demolding, and the chilled outer shell of the hook plastically deforms, while the relatively molten core undergoes a lesser amount of deformation.

In some implementations, purposefully forming touch fastener elements with divot 558 can result in one or more advantages. For example, the divot can provide a weak point in a central region of the head to about which the arms can bend to facilitate removal of the fastener elements from the corresponding mold cavity (see FIGS. 6-11), in cases where the shrinkage occurs with the molded fastener element still in its cavity. The divot also provides a receptacle that can receive a rigid cap material that, once solidified, braces or reinforces the head of the touch fastener element, which increases the stiffness of head. U.S. Provisional Patent Application No. 61/713,962, the entirety of which is incorporated herein by reference, describes various methods and apparatus for providing rigid caps to the heads of fastener elements. The head can also be reinforced to increase its stiffness using various other techniques, unrelated to the divot. For example, an electron beam polymer cross-linking process can be used to selectively stiffen the resin in the head, without significantly altering the resin of the stem. It can be particularly advantageous to stiffen the head of fastener element when soft resins are used.

Figure 16:
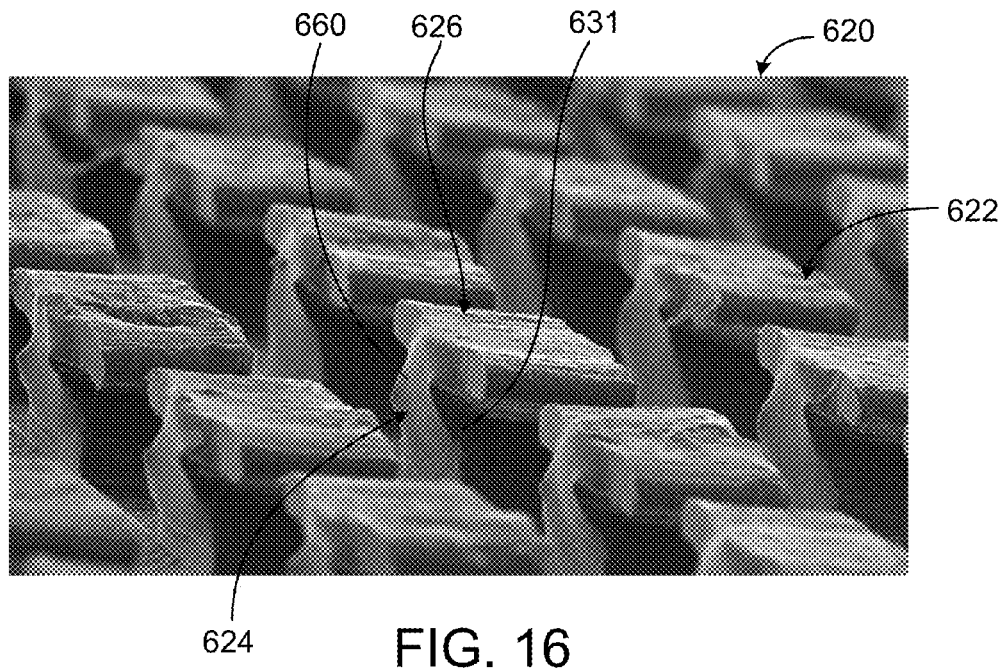
FIG. 16 is a photograph of a touch fastener product with hammer hook fastener elements that exhibit cross-machine direction features near the neck of the stem and the head.

FIG. 16 shows still another example of a touch fastener product 620 produced according to the continuous molding techniques and apparatus described above with reference to FIG. 1. Again, touch fastener product 620 was produced without the optional lamination process. Notably however, the optional knock down operation was performed. In this implementation, the resin was a high modulus polypropylene resin (having a modulus of about 300 ksi or about 2,068 MPa) filled with about 20 wt % Calcium Carbonate; the line speed was within a range of about 80-160 ft./min. (about 24.4-48.8 meters/min.); the nip pressure was developed by applying about 2,000 pounds of calender contact pressure per inch of resin (about 225.55 kN per mm), the hook cavities were dimensioned according to Example 1 as set forth in Table 1; and the temperature at the calender roller was about 125° F. (about 51.7° C.).

In this implementation, fastener elements 622 exhibit features 660 that project outward in the lateral or cross-machine direction that can engage fibers, which should result in increased fastening strength. As shown, features 660 are formed near the interface between the neck of stem 624 and head 626. In this implementation, features 660 were formed during the knock down operation where the touch fastener product was introduced to a nip between the base and calender rollers. More specifically, the cross-machine direction features are formed with the gap between rollers at the nip is significantly smaller than the total hook height, causing the calender roller to cause some buckling around the neck of the stem. Of course, characteristics of the resin (e.g., elastic modulus, degree of solidification, etc.) will also play a role in the "selective buckling" that forms the cross machine direction features.

Note also that the buckling deforms the shape of the underarm crooks 631. As shown, crooks 631 have a crescent shape that may more aggressively ensnare and more tenaciously retain fibers than the as molded rounded crooks of previously examples.

Figure 17:
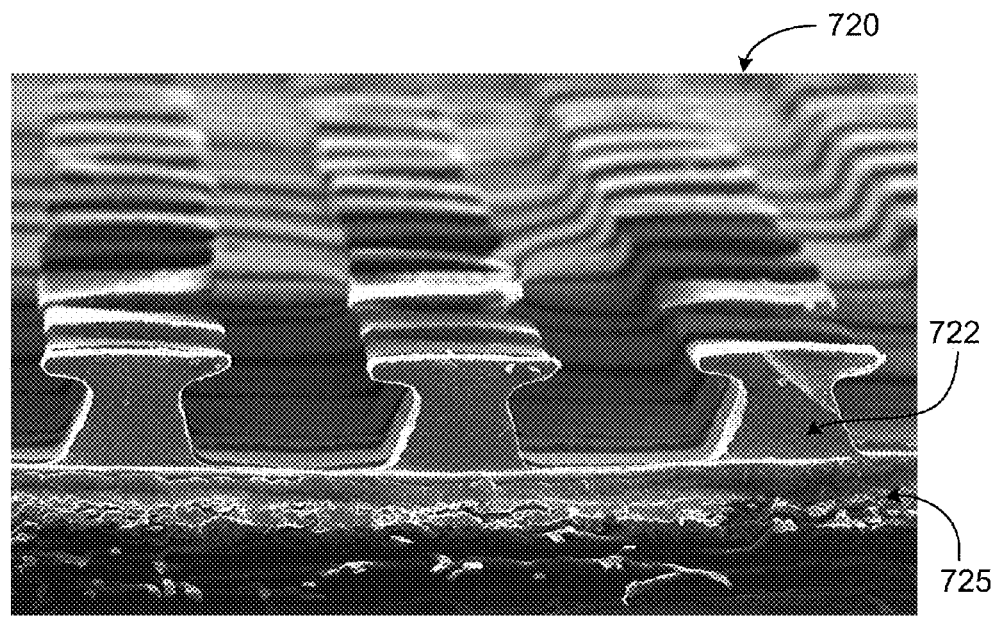
FIG. 17 is a photograph of a touch fastener product where the hammer hook fastener elements are supported on a non-woven backing sheet.

FIG. 17 shows still another example of a touch fastener product 720 produced according to the continuous molding techniques and apparatus described above with reference to FIG. 1. Notably, touch fastener product 720 was produced with the optional lamination process. Thus, the fastener elements 722 are supported on a non-woven backing sheet 725. In this implementation, the resin was a polypropylene composition modified with a thermoplastic rubber (note that this particular resin is a low modulus polymer with extremely high resilience); the line speed was within a range of about 80-160 ft/min.; the nip pressure was developed by applying about 2,000 pounds of calender contact pressure per inch of resin (about 225.55 kN per mm); the hook cavities were dimensioned according to Example 1 as set forth in Table 1; and the temperature at the calender roller was in a range of about 60-80° F. (about 15.5-26.7° C.).

The resulting fastener elements 722 have the characteristic hammer head shape with heads that exhibit substantially flat outer surfaces. The fastener elements have a total height of about 274 microns, a longitudinal thickness at the neck of the stem that is about 208 microns, a longitudinal thickness at the base of about 312 microns, a head height of about 85 microns, and a head length of about 437 microns. The arms of the head project outward in either longitudinal direction to overhang the base at an arm length of about 115 microns. Further, the fastener elements are spaced apart a constant interval of about 333 microns measured between the rounded tips of the outwardly projecting arms, and about 398 microns measured at the base. As shown, the tips are not re-entrant, in that they don't point downward toward the base.

Figure 18:
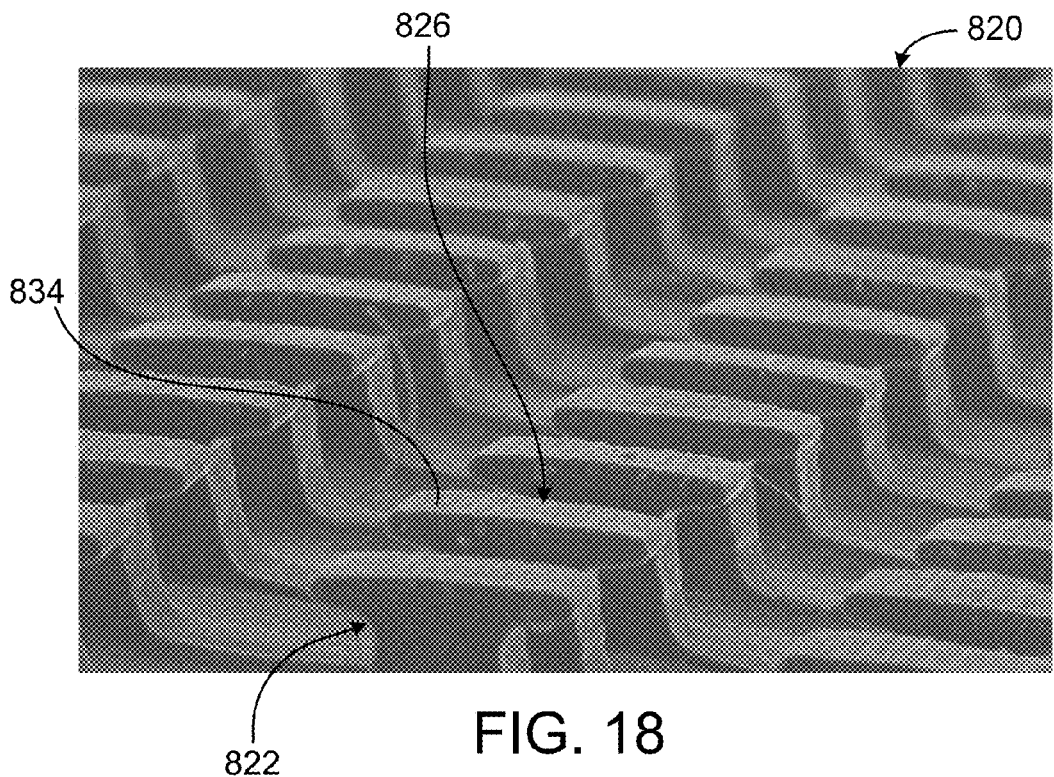
FIG. 18 is a photograph of a touch fastener product where the heads of the hammer hook fastener elements feature a slightly curved outer surface.

FIG. 18 shows yet another example of a touch fastener product 820 produced according to the continuous molding techniques and apparatus described above with reference to FIG. 1. The fastener product was produced under the same process parameters as the example shown in FIG. 17. However, in this implementation, the resin was a linear low density polyethylene.

The resulting fastener elements 822 have the characteristic hammer head shape with heads 826 that notably exhibit the outer surface 834 slightly curved outwardly. As noted above, the curved outer surface can be a result of the relatively soft resin used in the molding process, allowing the head to recover more of its molded shape after removal from the mold cavity. The fastener elements have a total height of about 307 microns, a longitudinal thickness at the neck of the stem that of about 215 microns, a longitudinal thickness at the base of about 316 microns, a head height of about 85 microns, and a head length of about 450 microns. The arms of the head project outward in either longitudinal direction to overhang the base at an arm length of about 118 microns.

Figure 19:
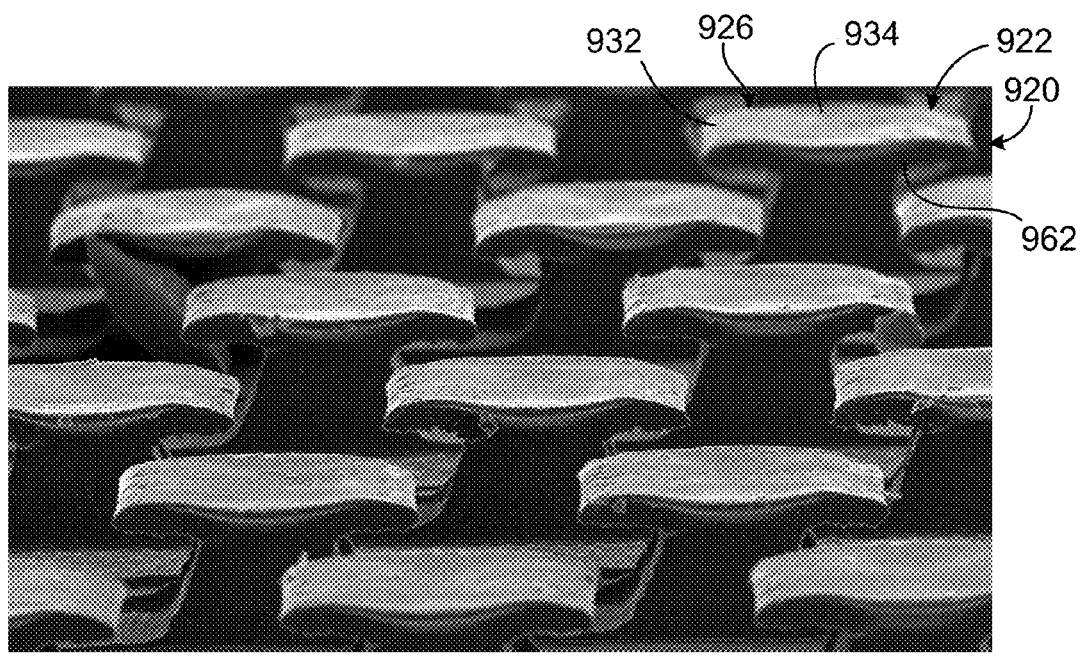
FIG. 19 is photograph in side view of a touch fastener product where the heads of the hammer hook fastener elements have laterally extending wing features.
Figure 20:
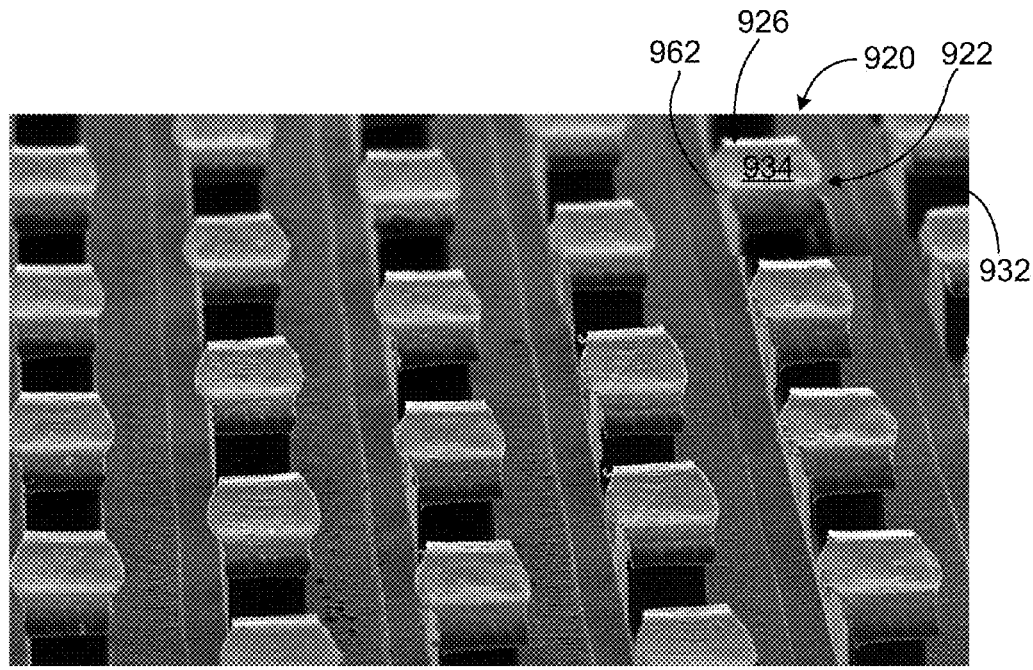
FIG. 20 is photograph in front view of the touch fastener product of FIG. 19.
Figure 21:
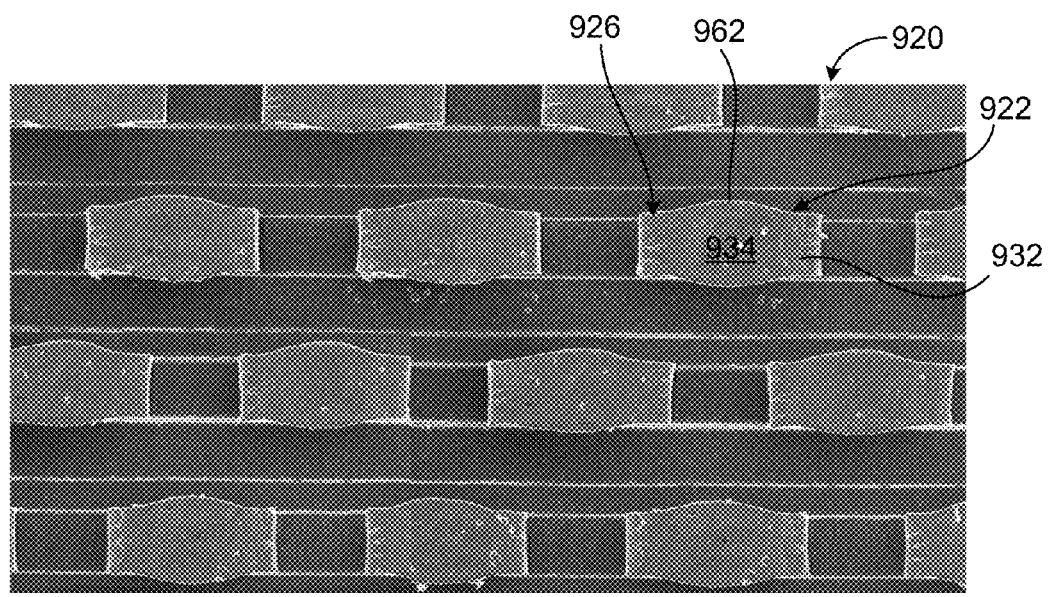
FIG. 21 is a photograph in top view of the touch fastener product of FIGS. 19 and 20.

Referring next to FIGS. 19-21, touch fastener product 920 has been subjected to a heated knock down process that flattens fastener elements 922. In particular, the calender roller was designed to heat the tops of the heads 926 while any arms that remain sprung after molding are flattened. In this case, the heads were heated beyond the melting point of the resin (in this case to about 295° F. or about 146° C.), causing localized melting at the outer surface 934 of head 926. The melted resin is pressed laterally outward to form wing structures 962 that overhang the base in the cross-machine direction. As shown, the wings terminate in slightly downturned tips.

From the top view, the profile of head 926 includes a circular shape in the center with opposing longitudinal extensions defining the arms 932 that extend outwardly from the central region of the head. In this example, wings 962 overhang the base by about 10 microns. The wings provide an additional feature that can engage fibers, which may result in increased fastening strength of the fastener product. Further, the melted top surfaces are particularly flat and smooth, so that the fastener product feels soft to the touch of a user.

Figure 22:
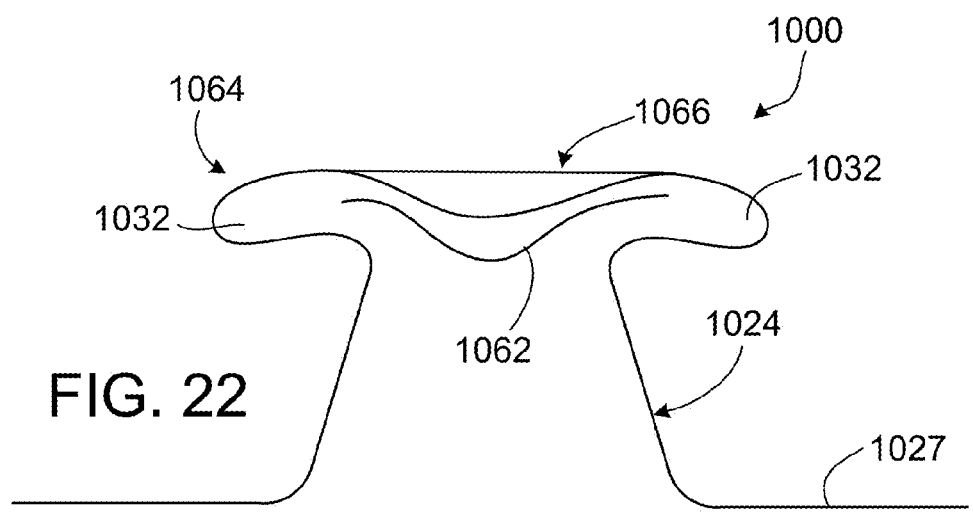
FIG. 22 is a side view of fastening structure featuring two stems that share a common head.
Figure 23:
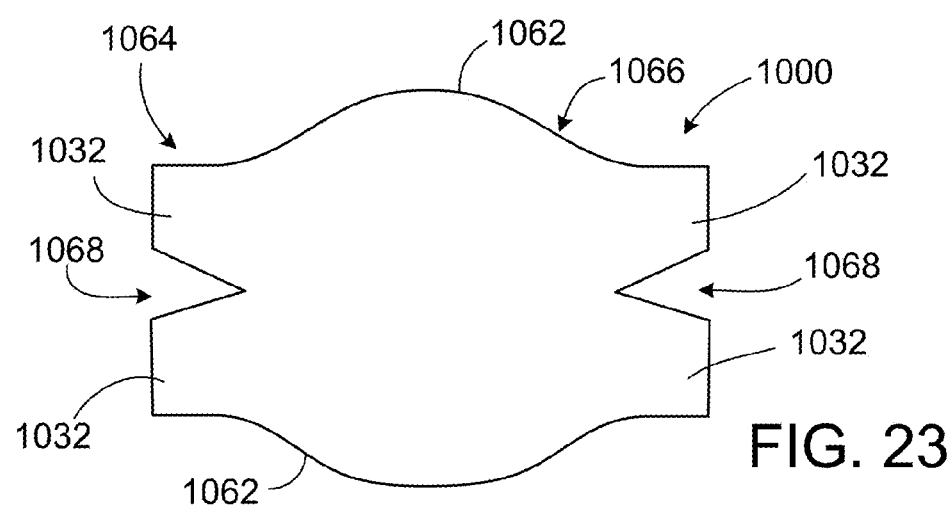
FIG. 23 is a top view of the fastening structure of FIG. 22.
Figure 24:
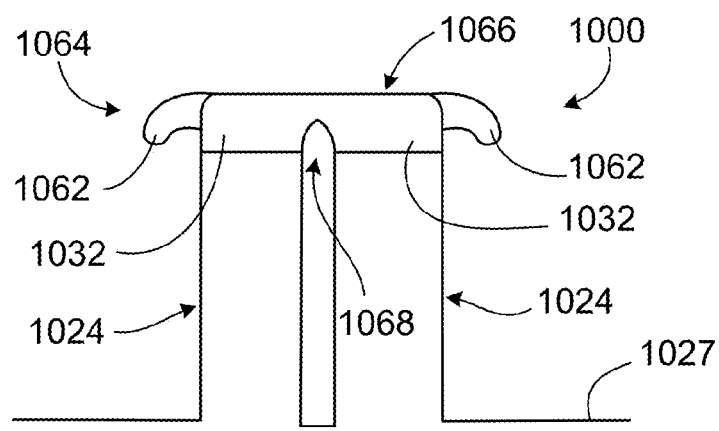
FIG. 24 is a front view of the fastening structure of FIGS. 22 and 23.

FIGS. 22-24 show an example of a fastener product 1000 featuring loop engageable structures 1064 formed on a continuous base 1027. Structures 1064 include two adjacent molded stems 1024 that share a large combined head 1066. In this case, the combined head functions as an umbrella that overhangs the base surrounding the adjacent stems. Structures 1064 provide a particularly strong construction because any load on the combined head is supported by two separate stems.

In side view, structures 1064 strongly resemble fastener elements 922 from the previous example. In fact, structures 1064 can be formed by melding the heads 926 of two adjacent molded fastener elements 922. In particular, the circular center portion of the heads can be melded together to form the single monolithic construction of the combined head. Thus, head 1066 features laterally projecting wings 1062 that provide cross-machine direction fastening features. Further, the extensions that form the arms 1032 of the respective melded heads define central notches 1068 at either longitudinal end of the head 1066, as the central portions of the heads flow together but their longitudinal extremities remain separated. Each notch provides a feature that can help to snag and/or retain fibers, increasing fastening performance.

Figure 25:
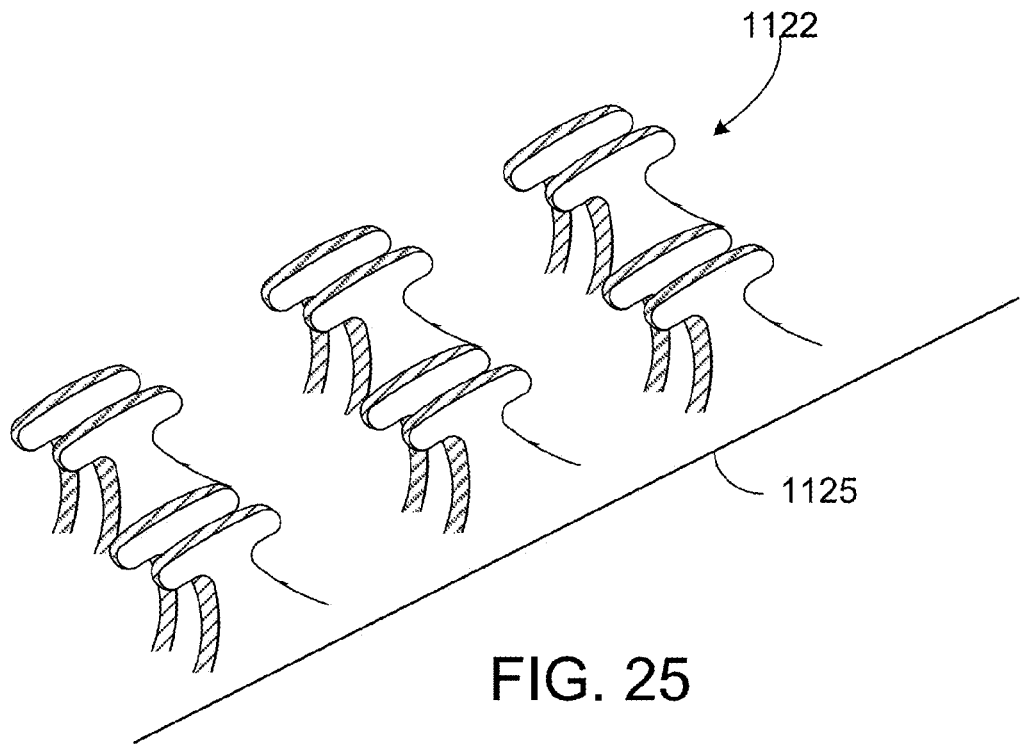
FIG. 25 is a perspective view of a molded touch fastener product featuring an array of hammer hook fastener elements designed to produce the fastening structures of FIGS. 22-24.
Figure 26:
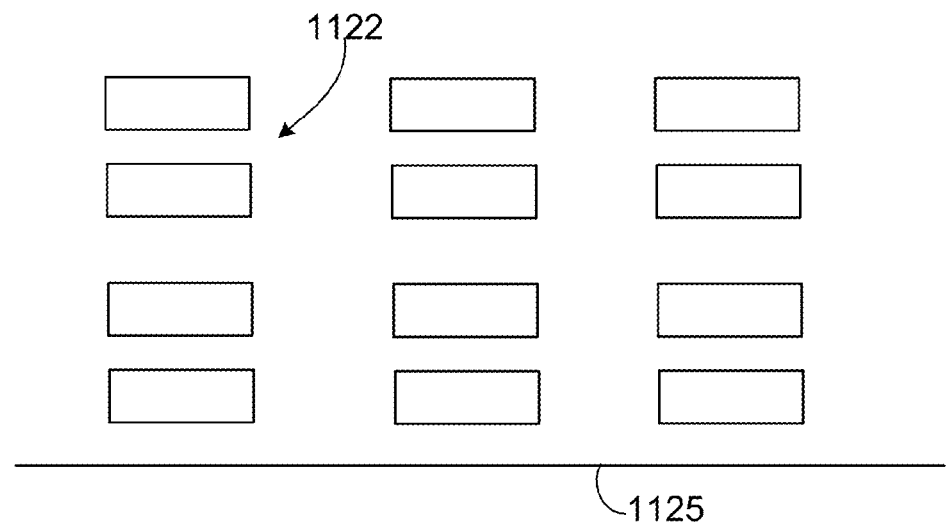
FIG. 26 is a top view of the molded touch fastener product of FIG. 25.
Figure 27:
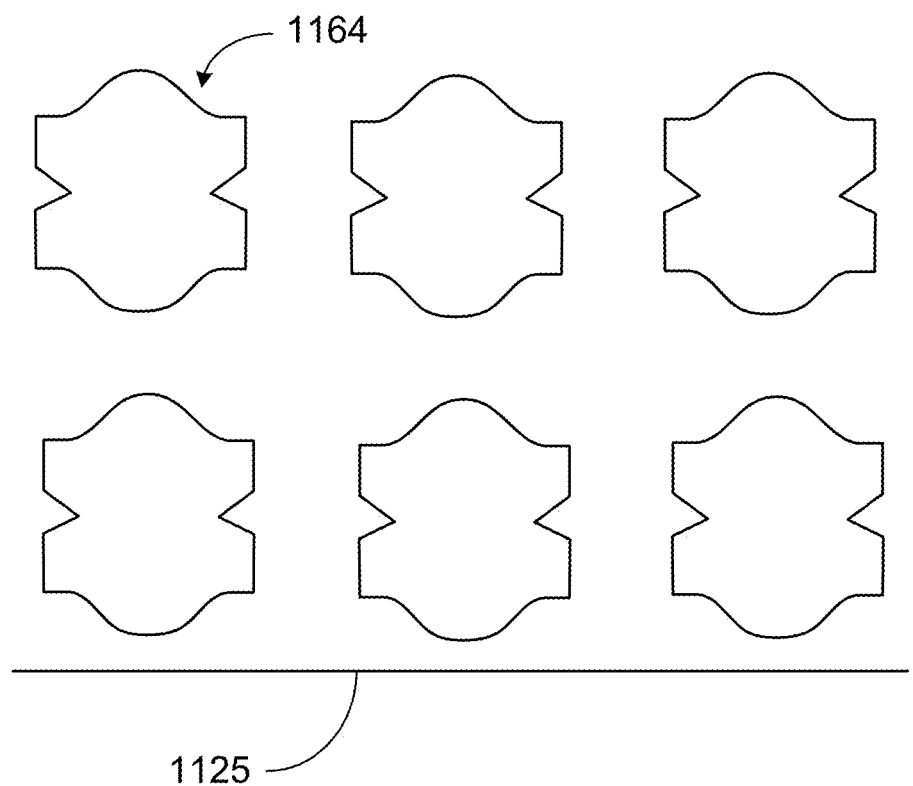
FIG. 27 is a top view of a touch fastener product featuring the fastening structures of FIGS. 22-24.

As noted above, these loop engageable structures can be formed by melding the heads of two adjacent hammer hook fastener elements with a heated calender roller. FIGS. 25-27 show how such a technique could be implemented, for example, by molding a touch fastener product with a particular type of fastener element array, and introducing the product to a heated calender roller. In this example, the array includes multiple pairs of hammer hook fastener elements 1122 in close proximity to one another on the base 1125. As shown, each fastener element pair includes two fastener elements 1122 aligned next one another in the lateral direction of the base 1125. In particular, the fastener elements in each pair are closer to one another, in at least the lateral direction, than any of the other fastener elements in the array. This configuration can be achieved by placing very thin spacer plates (e.g., spacer plates that are at most about 0.004 inch or about 101 microns thick) between adjacent hook cavity rings of a mold roll. In some examples, the paired fastener elements are closer to one another in all directions of the base than any of the other fastener elements. The close proximity of the paired fastener elements 1122 allows the respective heads to meld together when contacted by the heated calender roller, resulting in loop engageable structures 1164 with combined heads.

While a number of examples have been described for illustration purposes, the foregoing description is not intended to limit the scope of the invention, which is defined by the scope of the appended claims. There are and will be other examples and modifications within the scope of the following claims.

What is claimed is:

1. A method of making a touch fastener, the method comprising
    filling an array of discrete cavities with moldable resin, the cavities each opening onto an outer surface of a mold and otherwise closed, each cavity having a stem portion extending from the outer mold surface to a head portion undercut on two opposite sides of the stem portion;
    forming a layer of moldable resin on the outer mold surface, such that the layer of resin interconnects the discrete cavities;
    at least partially solidifying the resin in the filled cavities to form resin projections extending from the resin layer; and
    with the cavities remaining closed, withdrawing the projections from their cavities, such that the projections, as withdrawn from their cavities, each comprise a stem and a distal head extending to tips overhanging the resin layer on two opposite ends of the head,
    wherein the head portion of each cavity is distally bounded by a surface with two opposing inner edges that, as the farthest edges from the outer mold surface, are curved inwardly, away from the outer mold surface, at least along a central region of the head portion centered over the stem portion of the cavity.

2. The method of claim 1, wherein the cavities are filled with resin having a modulus of between 100 and 300 ksi.

3. The method of claim 1, wherein the inner edges are radiused.

4. The method of claim 1, wherein the inner edges are curved inwardly over a greatest dimension of the head portion.

5. The method of claim 1, wherein the inner edges are curved inwardly along an entire width of the head portion.

6. The method of claim 1, wherein the inner edges define a radius of curvature, a center of the radius of curvature being disposed on an opposite side of the outer surface of the mold.

7. The method of claim 1, wherein the surface bounded by the inner edges is curved inwardly over an entire width between the inner edges.

8. The method of claim 1, wherein the stem portion has a lateral thickness that is at least 50 percent of a farthest distance of the head portion from the mold surface.

9. The method of claim 1, wherein the head portion of each cavity is undercut on only the two opposite sides of the stem portion, such that the heads, as withdrawn from the cavities, overhang the resin layer on only two sides of each stem.

10. The method of claim 9, further comprising, after withdrawing the projections from the cavities, modifying the heads to cause the heads to overhang the resin layer on more than two sides of each stem.

11. The method of claim 1, wherein the cavities are shaped such that the stems of the projections, as withdrawn from the cavities, each have two, oppositely directed flat sides.

12. The method of claim 11, wherein the head portion of each cavity is shaped such that the heads of the projections have two, oppositely directed flat sides coplanar with the flat sides of the stems.

13. The method of claim 1, wherein the heads of the projections, as withdrawn from the cavities, have outer surfaces directed away from the resin layer that are bounded by edges that are curved outwardly over at least central regions of the heads.

14. The method of claim 13, wherein the outer surfaces of the heads of the projections are curved outwardly over at least central regions of the heads.

15. The method of claim 13, wherein the outer surfaces of the heads are concave in the central regions of the heads, such that the outer surfaces of the heads define recesses.

16. The method of claim 1, wherein the outer mold surface is a circumferential surface of a mold roll into which mold roll the cavities extend, and wherein filling the array of cavities comprises pressing the resin into the mold roll as the mold roll is rotated.

17. The method of claim 1, wherein the formed resin layer is longitudinally continuous.

18. The method of claim 1, further comprising laminating the resin layer to a substrate.

19. The method of claim 18, further comprising forming a series of resin layers along a length of the substrate, each layer carrying multiple projections.

20. The method of claim 18, wherein laminating the resin layer comprises introducing the substrate to molten resin of the resin layer and pressing the molten resin into surface recesses of the substrate.

21. The method of claim 18, wherein the cavities are filled with resin having a modulus of between 1.5 and 300 ksi.

22. The method of claim 21, wherein the cavities are filled with a resin having a modulus between 1.5 and 40 ksi.

23. The method of claim 22, wherein the cavities are filled with a resin having a modulus between 1.5 and 15 ksi.

24. The method of claim 1, further comprising, after withdrawing the projections, increasing a stiffness of only the heads of the projections.

25. The method of claim 24, wherein increasing the stiffness of only the heads comprises applying a rigid cap material to the head.

26. The method of claim 24, wherein increasing the stiffness of only the heads comprising implementing a polymer cross-linking process.

27. The method of claim 1, further comprising, after withdrawing the projections, plastically deforming the heads of the projections.

* * * * *